UNITED STATES PATENT OFFICE.

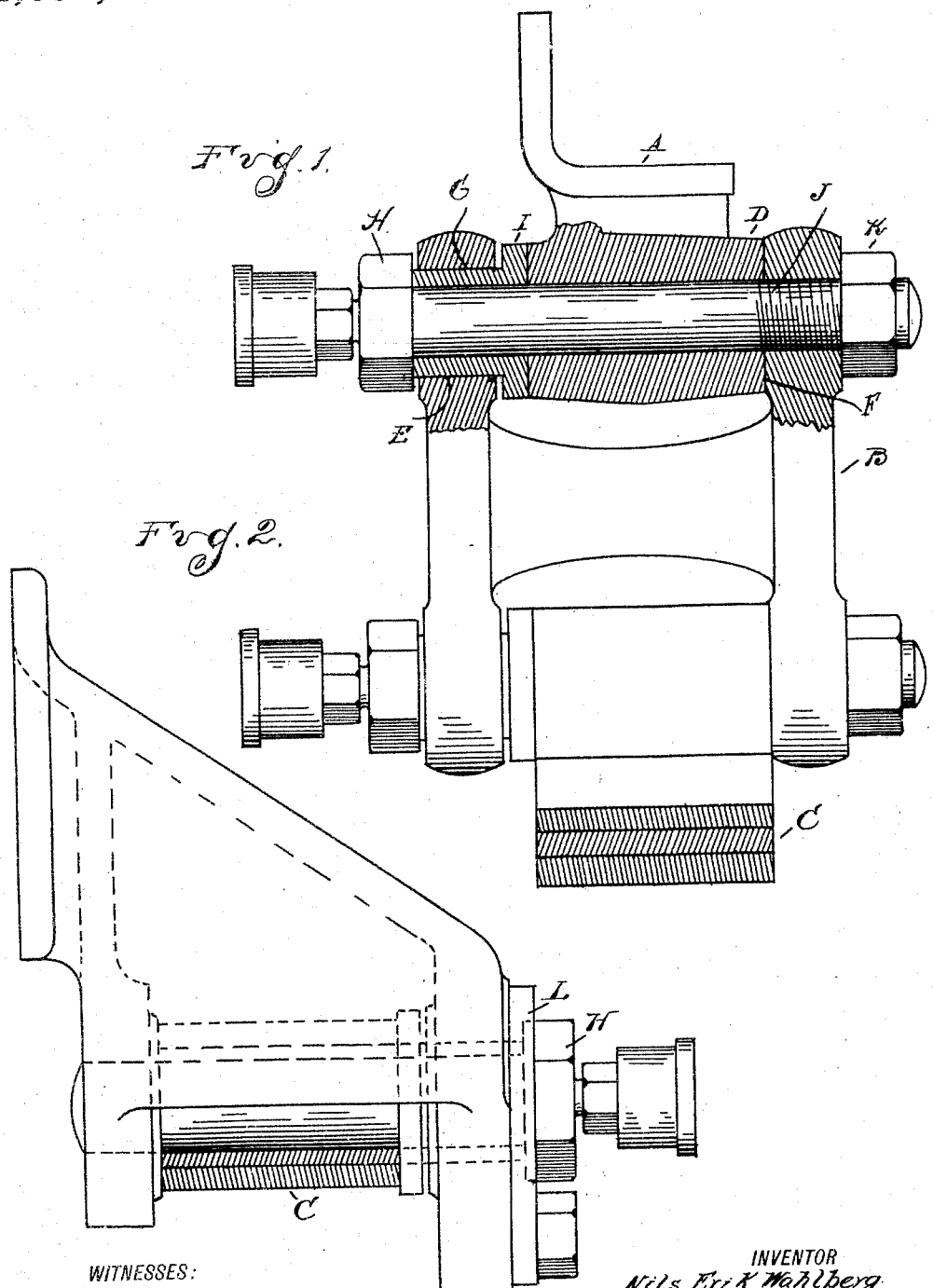

NILS ERIK WAHLBERG, OF PONTIAC, MICHIGAN, ASSIGNOR TO OAKLAND MOTOR CAR COMPANY, OF PONTIAC, MICHIGAN, A CORPORATION OF MICHIGAN.

VEHICLE SPRING CONNECTION.

1,099,677.      Specification of Letters Patent.      Patented June 9, 1914.

Application filed March 3, 1914. Serial No. 822,177.

*To all whom it may concern:*

Be it known that I, NILS ERIK WAHLBERG, a citizen of the United States of America, residing at Pontiac, in the county of Oakland and State of Michigan, have invented certain new and useful Improvements in Vehicle Spring Connections, of which the following is a specification, reference being had therein to the accompanying drawings.

The invention relates to vehicle springs, and more particularly to the connecting means between the spring and vehicle frame.

It is the object of the invention to obtain a construction in which adjustment may be readily made to take up wear and prevent rattling, as hereinafter set forth.

In the drawings: Figure 1 is a sectional elevation of a vehicle spring supporting shackle and bracket; Fig. 2 is a similar view showing a bracket without the shackle.

In the present state of the art, vehicle springs, such as elliptic, semi-elliptic and leaf spring constructions, are usually attached to the frame through pivotal connections to brackets or shackles. The constant vibration or oscillation of the parts when the vehicle is in motion will produce wear which in a short time results in rattling. With my improved construction, provision is made for easily taking up any wear, so as to prevent this rattling.

In detail, A is a bracket attached to the frame; B is a shackle pivotally connected to the bracket and at its opposite end pivotally connected to the spring C; and D are bolts or pins forming the pivotal connections and which pass through alined eyes E and F respectively in the shackle and bracket or spring. The shackle B is bifurcated to embrace the eyes F, and as the separated arms or furcations are a fixed distance apart they cannot be adjusted to take up lateral wear. I have, however, made provision for this lateral adjustment by placing a sleeve G upon the bolt D adjacent to the head H thereof, forming on the inner end of this sleeve a head I which bears against the bracket. The opposite end of the bolt D is threaded at J to engage a correspondingly threaded bearing in the arm of the shackle, and a lock nut K is employed to hold the parts in any desired position of adjustment. In use, whenever the parts wear so as to produce play between the sleeve G and the eye F on the bracket, this lost motion may be taken up by loosening the lock nut K and then turning the head H of the bolt so as to secure the same into the threaded bearing in the shackle. This will carry the bushing G and head I thereof with the bolt and will take up the lost motion. A similar adjustment may be made between the shackle and spring.

In Fig. 2 a similar construction is shown, but one in which the eye of the spring is directly attached to the bracket without the medium of the shackle. With this construction the placing of the lock nut upon the opposite end of the bolt from the head would not be a convenient location for adjustment, and I have therefore substituted a locking device L, which directly engages the hexagonal head H of the bolt.

What I claim as my invention is:

1. A pivotal connection for vehicle springs, comprising a bifurcated bearing embracing the same and apertured in alinement therewith, a pivot pin passing through the alined bearings, a sleeve upon said pin engaging the aperture in one of the furcations and extending between opposed shoulders on said pin and the embraced bearing, and means for longitudinally adjustably securing said pin in the opposite furcation.

2. A pivotal connection for vehicle springs, comprising an apertured bearing, a bifurcated bearing embracing the same and apertured in alinement therewith, a pivot pin passing through said alined apertures and having a threaded engagement with one of the furcations, a sleeve upon said pin engaging the opposite furcation, its inner end contacting with the embraced bearing, and a head on said pin forming a shoulder in contact with the opposite end of said sleeve.

3. A pivotal connection for vehicle springs, comprising an apertured bearing, a bifurcated bearing embracing the same and apertured in alinement therewith, a pin passing through said alined apertures having a threaded end engaging one of the furcations, a sleeve upon said pin engaging the aperture in the opposite furcation, its inner end being in contact with the end of the embraced bearing, a head on said pin contacting with the opposite end of said sleeve, and means for locking said pin in different positions of adjustment of its threaded portion with the threaded furcation.

4. A pivotal connection for vehicle springs, comprising an apertured bearing, a bifurcated member embracing said bearing and apertured in alinement therewith, a pivot pin engaging said alined apertures and threaded at one end to engage corresponding threads in one of the furcations, a sleeve upon said pin engaging the opposite furcation, provided at its inner end with a head forming an end thrust face for the embraced bearing, a head on said pin forming a shoulder for the opposite end of said sleeve, and a lock nut engaging the threaded portion of said pin adjacent to said threaded furcation.

In testimony whereof I affix my signature in presence of two witnesses.

NILS ERIK WAHLBERG.

Witnesses:
WM. J. BELKNAP,
JAMES P. BARRY.